US011301841B2

(12) United States Patent
Ko et al.

(10) Patent No.: US 11,301,841 B2
(45) Date of Patent: Apr. 12, 2022

(54) METHOD AND SYSTEM FOR AUTHENTICATING A VIRTUAL CURRENCY INSTRUMENT

(71) Applicant: SONY CORPORATION, Tokyo (JP)

(72) Inventors: Thomas Woonyoung Ko, Monroe Township, NJ (US); Makoto Koike, Tokyo (JP); Pramod Chintalapoodi, San Diego, CA (US)

(73) Assignee: SONY CORPORATION, Tokyo (JP)

( * ) Notice: Subject to any disclaimer, the term of this patent is extended or adjusted under 35 U.S.C. 154(b) by 1041 days.

(21) Appl. No.: 14/933,255

(22) Filed: Nov. 5, 2015

(65) Prior Publication Data

US 2016/0335625 A1 Nov. 17, 2016

Related U.S. Application Data

(60) Provisional application No. 62/160,706, filed on May 13, 2015.

(51) Int. Cl.
*G06Q 20/00* (2012.01)
*G06Q 20/36* (2012.01)
(Continued)

(52) U.S. Cl.
CPC ....... *G06Q 20/3674* (2013.01); *G06Q 20/065* (2013.01); *G06Q 20/38215* (2013.01); *G06Q 20/40145* (2013.01)

(58) Field of Classification Search
CPC ........... G06Q 2220/00; G06Q 2220/10; G06Q 2220/16; G06Q 20/3674; G06Q 20/38215;
(Continued)

(56) References Cited

U.S. PATENT DOCUMENTS

2003/0061170 A1\* 3/2003 Uzo ..................... G06Q 20/367
705/64
2008/0073426 A1 3/2008 Koh et al.
(Continued)

FOREIGN PATENT DOCUMENTS

CN 104504565 A 4/2015
JP 2002-279195 A 9/2002
(Continued)

OTHER PUBLICATIONS

"A quick FAQ on Offline Data Authentication (ODA) and offline PIN encipherment", Retrieved from the Internet http://tsys.com/Assets/TSYS/downloads/br_faq-on-offline-data-authentication.pdf, 2014, 02 pages.
(Continued)

*Primary Examiner* — Dante Ravetti
(74) *Attorney, Agent, or Firm* — Chip Law Group

(57) ABSTRACT

Various aspects of a method and system for authentication of a virtual currency instrument for a monetary transaction are disclosed herein. In accordance with an embodiment, the method includes activation of a software module different from a payment application at an electronic device. An authentication of secure information, which is read through the payment application by the software module, is performed at the electronic device. Output of an authentication result occurs at the electronic device based on the authentication from the software module for the monetary transaction.

16 Claims, 10 Drawing Sheets

(51) Int. Cl.
*G06Q 20/38* (2012.01)
*G06Q 20/06* (2012.01)
*G06Q 20/40* (2012.01)

(58) Field of Classification Search
CPC .......... G06Q 20/065; G06Q 20/40145; G06Q 20/3263; G06Q 20/326
USPC ............................... 705/16, 21; 380/44, 262
See application file for complete search history.

(56) References Cited

U.S. PATENT DOCUMENTS

| | | | | |
|---|---|---|---|---|
| 2010/0325039 | A1* | 12/2010 | Radu | G06Q 20/38 705/39 |
| 2012/0066758 | A1* | 3/2012 | Kasturi | G06F 21/34 726/9 |
| 2012/0246079 | A1* | 9/2012 | Wilson | H04L 63/0807 705/67 |
| 2013/0127980 | A1* | 5/2013 | Haddick | G06F 3/013 348/14.08 |
| 2014/0250018 | A1* | 9/2014 | Phillips | G06Q 20/4012 705/72 |
| 2015/0112870 | A1* | 4/2015 | Nagasundaram | G06Q 20/3821 705/67 |
| 2015/0127549 | A1 | 5/2015 | Khan | |
| 2015/0287028 | A1* | 10/2015 | DeLuca | G06Q 20/382 705/44 |

FOREIGN PATENT DOCUMENTS

| | | |
|---|---|---|
| JP | 2006-195599 A | 7/2006 |
| JP | 2009-277082 A | 11/2009 |
| JP | 2015-508541 A | 3/2015 |

OTHER PUBLICATIONS

International Search report on patentability received for PCT Application No. PCT/JP2016/001945, dated Jun. 28, 2016, p. 5.

Office Action for JP Patent Application No. 2017-558576, dated Jun. 23, 2020, 16 pages of Office Action and 11 pages of English Translation.

Office Action for CN Patent Application No. 201680036089.4, dated Jul. 20, 2021, 16 pages of Office Action and 19 pages of English Translation.

Office Action for CN Patent Application No. 201680036089.4, dated Dec. 29, 2021, 21 pages of English Translation and 15 pages of Office Action.

* cited by examiner

METHOD AND SYSTEM FOR AUTHENTICATING A VIRTUAL CURRENCY INSTRUMENT

CROSS-REFERENCE TO RELATED APPLICATIONS/INCORPORATION BY REFERENCE

The present application claims priority to U.S. Provisional Application Ser. No. 62/160,706, filed May 13, 2015, the disclosure of which is herein incorporated by reference in its entirety.

FIELD

Various embodiments of the disclosure relate to authentication of a virtual currency instrument. More specifically, various embodiments of the disclosure relate to authentication of the virtual currency instrument by use of a payment application for a monetary transaction.

BACKGROUND

Advancements in the field of digital technology have extended the functionalities of various mobile payment systems, solutions, and/or associated applications. In certain scenarios, a credit card or a debit card number may be required to be entered into a merchant website for a monetary transaction over a communication network, such as the Internet. Such a transaction process may be inefficient, insecure, and/or prone to error. For example, during a transaction, a user may click on a "Refresh" button on an electronic device, such as a client device or a mobile device, connected to a merchant server. The click may result in double payments to the merchant. Such monetary transactions that require connectivity with a server over the Internet are usually processed as card-not-present (CNP) transactions. The CNP transactions are considered less secure and prone to fraud as compared to card-present transactions. In CNP transactions, it may be difficult to prove that the monetary transaction for a purchase is indeed authorized by an actual cardholder. In such a scenario, a merchant may bear a monetary loss in the event of a fraud or pay a higher fee for the CNP transaction, as compared to the card-present transactions. Currently, integrated circuit card (ICC)-based monetary transactions compliant to Europay, MasterCard, and Visa (EMV)® standard for chip payments may provide an additional layer of security, but may be useful only for the card-present transactions.

Further, in certain other scenarios, where direct connectivity with the server over the communication network cannot be established, the process becomes unusable, inefficient, insecure, and/or prone to error. Currently, the mobile payment solutions use tokenization. Tokenization stores a token in the mobile device instead of actual primary account number (PAN) of payment instrument, such as the credit card. By default, the mobile device that stores the token requires real-time connectivity with a token server over a communication network for validation of the token for a payment request. Therefore, tokenization may not be implemented in an offline scenario, where connectivity with the token server over the Internet may not be established. Thus, an improved mechanism may be required to ensure an efficient and/or fail-safe monetary transaction in various scenarios, such as the ones as mentioned above.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A method and a system for authentication of a virtual currency instrument by use of a payment application for a monetary transaction substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
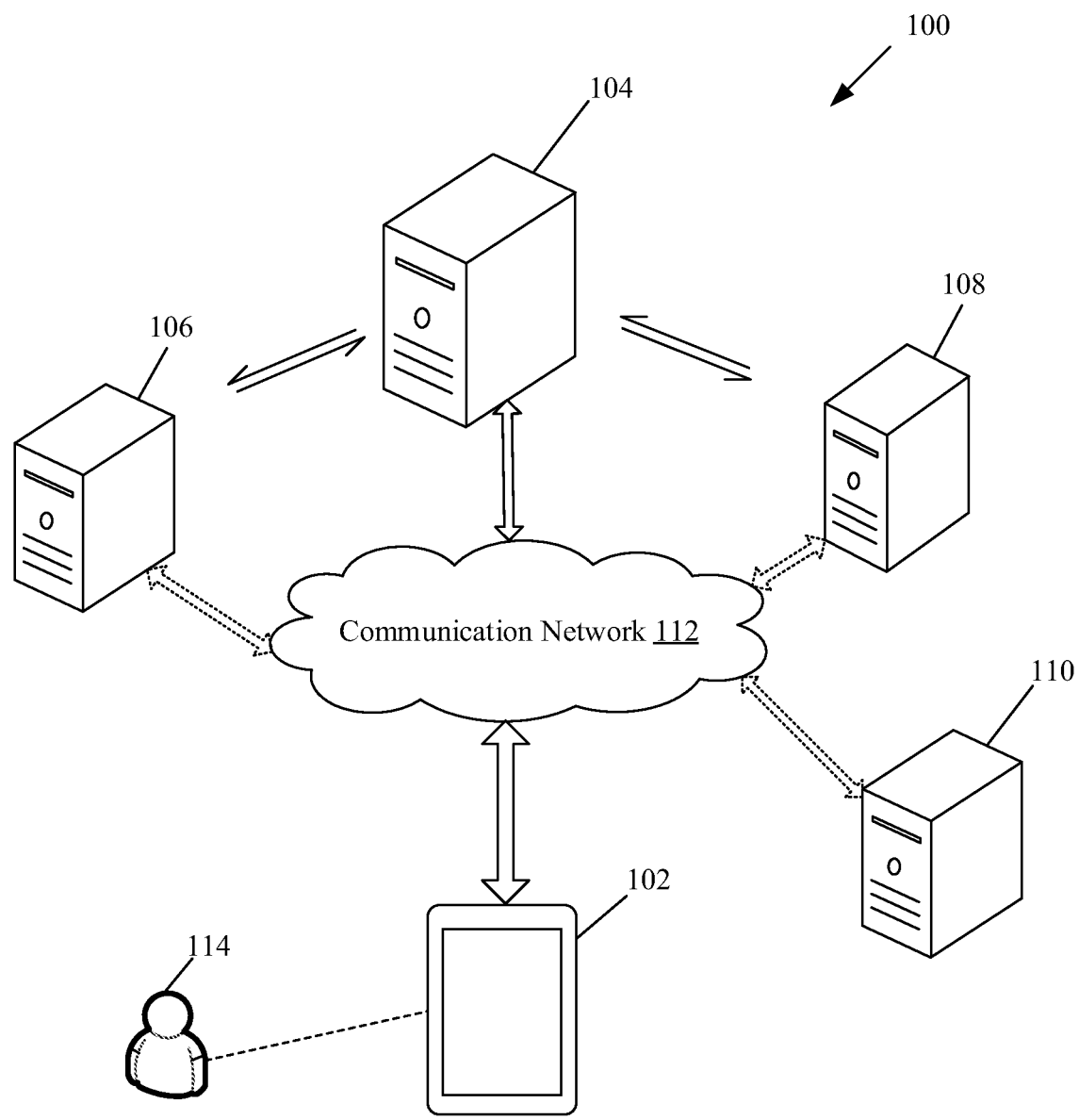
FIG. 1 is a block diagram that illustrates a network environment for authentication of a virtual currency instrument for a monetary transaction, in accordance with an embodiment of the disclosure.

Various implementations may be found in a method and/or a system for authentication of a virtual currency instrument by use of a payment application for a monetary transaction. The following embodiments are described in sufficient detail to enable those skilled in the art to make and use the disclosed embodiments. It is to be understood that other embodiments would be evident based on the present disclosure, and that system, process, or mechanical changes may be made without departing from the scope of the present disclosure.

In the following description, numerous specific details are given to provide a thorough understanding of the disclosure. However, it may be apparent that the disclosed embodiments may be practiced without these specific details. In order to avoid obscuring the present disclosure, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawings. Where multiple embodiments are disclosed and described having some features in common, for clarity and ease of illustration, description, and comprehension thereof, similar and like features one to another will ordinarily be described with similar reference numerals.

FIG. 1 is a block diagram that illustrates a network environment for authentication of a virtual currency instrument by use of a payment application for a monetary transaction, in accordance with an embodiment of the disclosure. With reference to FIG. 1, there is shown an exemplary network environment 100. The network environment 100 may include an electronic device 102, an acquirer 104, a token server 106, an issuer 108, a merchant server 110, a communication network 112, and one or more users, such as a user 114.

In accordance with an embodiment, the electronic device 102 may be communicatively coupled to the acquirer 104, the token server 106, and the merchant server 110, via the communication network 112. The acquirer 104, the token server 106, and the issuer 108, may be communicatively coupled to each other. In accordance with an embodiment, the electronic device 102 may not be communicatively coupled to the token server 106, the issuer 108, and/or the merchant server 110. Further, in accordance with an embodiment, the electronic device 102 may be in close proximity to an external apparatus (not shown). In such an embodiment, the electronic device 102 may exchange data with the external apparatus, via a short-range communication protocol, such as near field communication (NFC). The electronic device 102 may be associated with the user 114.

The electronic device 102 may comprise suitable logic, circuitry, interfaces, and/or code that may be configured to activate a software module of the electronic device 102. The software module may be pre-installed at the electronic device 102. The electronic device 102 may further comprise a payment application and/or a merchant application. The payment application, such as a mobile wallet, and the merchant application may be pre-installed at the electronic device 102. The electronic device 102 may be configured to perform an authentication of secure information that may be read through the payment application by the software module. The secure information may be associated with a virtual currency instrument, and may be stored at a secure storage of the electronic device 102. Examples of the electronic device 102 may include, but are not limited to, a mobile device, such as a smartphone, a tablet computer, a laptop, a Personal Digital Assistant (PDA), a client device, an Internet Protocol Television (IPTV), and/or other information processing devices.

The acquirer 104 may refer to one or more servers that may comprise suitable logic, circuitry, interfaces, and/or code that may be configured to receive requests from one or more devices, such as the electronic device 102. The acquirer 104 may correspond to an acquiring processor that may be configured to process monetary transactions on behalf of the acquirer 104. The acquirer 104 may be configured to receive a token from the electronic device 102 for an online approval of the monetary transaction. The acquirer 104 may correspond to a third-party service provider that acquires and processes payment requests for merchants, such as a merchant associated with the merchant server 110. The third-party service provider may manage the relationship with payment networks, such as Mastercard® and Visa® on behalf of the merchant. For example, fees payable to the payment networks and issuers, such as the issuer 108, on behalf of the merchant, may be managed by the acquirer 104. The payment networks may correspond to one or more token servers, such as the token server 106.

The token server 106 may refer to one or more servers that may comprise suitable logic, circuitry, interfaces, and/or code that may be configured to communicate a token associated with a virtual currency instrument to the electronic device 102. The token may be received at the time of registration of the virtual currency instrument, such as a credit card. The token is accepted by use of a payment application, such as a mobile wallet or other token-based payment application. The token may be a substitute value for actual primary account number (PAN) data associated with the virtual currency instrument owned by the user 114.

The issuer 108 may refer to one or more servers of a financial entity, such as a bank, that issues the virtual currency instrument to a cardholder, such as the user 114. The one or more servers may comprise data that corresponds to monetary value in an account or a credit line associated with the virtual currency instrument.

The merchant server 110 may refer to one or more servers that may comprise suitable logic, circuitry, interfaces, and/or code that may be configured to communicate with a merchant application and/or host a merchant website. The merchant server 110 may be configured to communicate one or more payment options to the electronic device 102, via the merchant application or the merchant website. In accordance with an embodiment, the merchant server 110 may be configured to communicate a software module, or a part of the software module, as an applet for a monetary transaction. Such a communication may occur when the monetary transaction is initiated by the user 114. The various servers, such as the acquirer 104, the token server 106, the issuer 108, and the merchant server 110, may be implemented by use of several technologies that are well known to those skilled in the art.

The communication network 112 may include a medium through which the electronic device 102 may communicate with one or more servers, such as the acquirer 104, and one or more other external apparatus or an external memory device (not shown). Examples of the communication network 112 may include, but are not limited to, the Internet, a cloud network, a Wireless Fidelity (Wi-Fi) network, a Wireless Local Area Network (WLAN), a Local Area Network (LAN), a telephone line (POTS), and/or a Metropolitan Area Network (MAN). Various devices in the network environment 100 may be configured to connect to the communication network 112, in accordance with various wired and wireless communication protocols. Examples of such wired and wireless communication protocols may include, but are not limited to, Transmission Control Protocol and Internet Protocol (TCP/IP), Long-Term Evolution (LTE), User Datagram Protocol (UDP), Hypertext Transfer Protocol (HTTP), File Transfer Protocol (FTP), ZigBee, EDGE, infrared (IR), IEEE 802.11, 802.16, and/or cellular communication protocols.

In operation, a virtual currency instrument may be registered by use of a payment application at the electronic device 102, by the user 114. The electronic device 102 may be configured to receive a token from the token server 106 at the time of registration of the virtual currency instrument. The electronic device 102 may be configured to receive input, from the user 114, to launch a merchant application at the electronic device 102 or access a merchant website, via the communication network 112. The electronic device 102 may be configured to receive input that may select one or more products to conduct a purchase through a monetary transaction.

In accordance with an embodiment, the merchant application or the merchant website associated with the merchant server 110 may be configured to capture data associated with selection of the one or more products, and may proceed to seek payment. The merchant application or the merchant website associated with the merchant server 110, may communicate one or more payment options to the electronic device 102.

In instances when the merchant website is used for a purchase, the electronic device 102 may be configured to communicate an identifier of the payment application, such as a mobile wallet, to the merchant server 110. The electronic device 102 may be configured to receive a payment request from the merchant server 110, in response to the communicated identifier. The payment request may be communicated by the merchant server 110, via a Multimedia Messaging Service (MMS), and/or a push notification, via the communication network 112. In accordance with an embodiment, a software module or at least a part of the software module, may be communicated together with the MMS and/or the push notification, via an email or link information for download. In instances when the merchant application is used for the purchase, such an identifier may not be communicated to the merchant server 110.

In accordance with an embodiment, the electronic device 102 may be configured to receive input to select the virtual currency instrument by use of the payment application. The virtual currency instrument may be selected in response to the receipt of the one or more payment options. The selection may indicate a confirmation by the user 114 for the monetary transaction for the purchase.

In accordance with an embodiment, the electronic device 102 may be configured to activate the software module at the electronic device 102. In instances when the merchant application is used for the purchase, the activation of the software module may be based on receipt of the token from the payment application. The receipt of the token may correspond to a confirmation of payment readiness by the user 114, who owns the token. The software module may be activated by the merchant application associated with the merchant server 110, based on receipt of the token from the payment application. In instances when the merchant website is used for the purchase, the activation of the software module may be based on receipt of biometric information of the user 114 at the electronic device 102. In such an instance, the biometric data provided by the user 114 indicates a confirmation by the user 114 for the monetary transaction.

In accordance with an embodiment, the electronic device 102 may be configured to generate a first request to receive permission of the user 114 to access secure information stored at a secure storage of the electronic device 102. The secure information may correspond to a cryptogram, static authentication data, and/or dynamic authentication data. In accordance with an embodiment, the secure information may be the token associated with the virtual currency instrument.

In accordance with an embodiment, the electronic device 102 may be configured to transmit an internal communication at the electronic device 102. A command may be sent from the software module to the payment application to request application cryptogram generation. The electronic device 102 may be configured to perform an authentication of the secure information read through the payment application by the software module. The authentication may be performed offline and may correspond to Static Data Authentication (SDA) or Dynamic Data Authentication (DDA), as defined in the EMV® standard for chip payments.

In accordance with an embodiment, the electronic device 102 may be configured to output an authentication result, based on the authentication from the software module for the monetary transaction. The authentication result may be transmitted to the merchant server 110 or an external apparatus, for the monetary transaction.

The electronic device 102 may be configured to generate a second request to receive biometric information of the user 114 associated with the secure information. In accordance with an embodiment, the electronic device 102 may be configured to compare the received biometric information of the user 114 with pre-stored biometric information of the user 114. The comparison may validate the user 114 and/or the electronic device 102, for the monetary transaction. The validation of the user 114 and/or the electronic device 102 may be an additional safety mechanism for the monetary transaction.

In accordance with an embodiment, the electronic device 102 may be configured to determine whether the monetary transaction is to be processed for offline approval or online approval. Such determination may be based on a monetary value associated with the monetary transaction and/or a state of connectivity with the token server 106. As an example, instead of the electronic device 102, an external apparatus, such as a POS terminal, may be configured to determine whether the monetary transaction is to be processed for offline approval or online approval.

In an instance, the monetary value associated with the monetary transaction is above a threshold value and/or the state of connectivity with the token server 106 is established. In such an instance, the electronic device 102 may be configured to communicate the token to the acquirer 104 for an online approval of the monetary transaction. The electronic device 102 may be configured to generate a payment confirmation message, based on the approval from the acquirer 104. The acquirer 104 receives a confirmation of validation of the token from the token server 106, in association with the issuer 108 of the selected virtual currency instrument.

In an instance, the monetary value associated with the monetary transaction is below a threshold value and/or the state of connectivity with the token server 106 is not established. In such an instance, the electronic device 102 may be configured to perform a communication of a request by the software module to the payment application to proceed with offline approval of the token. The electronic device 102 may be configured to generate an offline approval message for the monetary transaction. The offline approval message may be generated by the software module or another software module, such as an offline token module, for offline authentication and approval of the monetary transaction. The offline approval may occur based on an offline validation of biometric information of the user 114 who owns the token, or the personal identification number (PIN) code associated with the user 114.

The electronic device 102 may be configured to render a payment confirmation message at the electronic device 102, for the monetary transaction based on the generation of the offline approval message. The payment confirmation message that indicates a final approval for the monetary transaction may be rendered by the software module. In instances when the generated offline approval message is communicated to an external apparatus, via a short-range communication protocol, the payment confirmation message may be rendered at the external apparatus.

Figure 2:
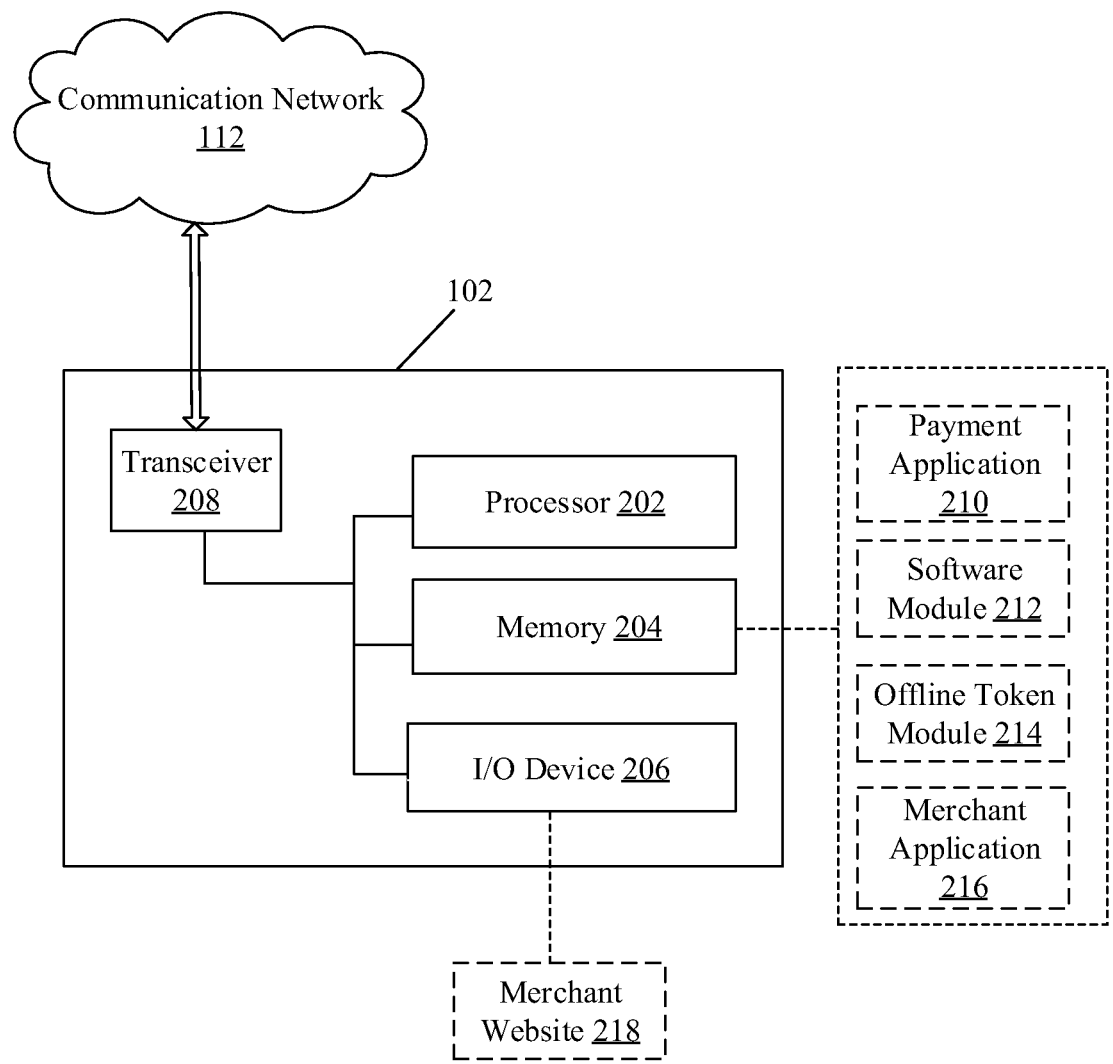
FIG. 2 is a block diagram that illustrates an exemplary electronic device, in accordance with an embodiment of the disclosure.

FIG. 2 is a block diagram that illustrates an exemplary electronic device, in accordance with an embodiment of the disclosure. FIG. 2 is explained in conjunction with elements from FIG. 1. With reference to FIG. 2, there is shown the electronic device 102. The electronic device 102 may comprise one or more processors, such as a processor 202, a memory 204, one or more input/output (I/O) devices, such as an I/O device 206, and a transceiver 208. There is further shown a payment application 210, a software module 212, an offline token module 214, a merchant application 216, and a merchant website 218.

The processor 202 may be communicatively connected to the memory 204, the I/O device 206, and the transceiver 208. The transceiver 208 may be operable to communicate with one or more servers, such as the acquirer 104, via the communication network 112, in an online shopping environment. In accordance with an embodiment, transceiver 208 may be operable to communicate with an external apparatus, via a short-range wireless communication, such as near field communication (NFC) protocol, in an offline shopping environment. The payment application 210, the software module 212, the offline token module 214, and the merchant application 216 may be pre-installed in the memory 204.

The processor 202 may comprise suitable logic, circuitry, interfaces, and/or code that may be operable to execute a set of instructions stored in the memory 204. The processor 202 may be implemented, based on a number of processor technologies known in the art. Examples of the processor 202 may be an X86-based processor, X86-64-based processor, a Reduced Instruction Set Computing (RISC) processor, an Application-Specific Integrated Circuit (ASIC) processor, a Complex Instruction Set Computing (CISC) processor, a central processing unit (CPU), an Explicitly Parallel Instruction Computing (EPIC) processor, a Very Long Instruction Word (VLIW) processor, and/or other processors or circuits.

The memory 204 may comprise suitable logic, circuitry, and/or interfaces that may be operable to store a set of instructions executable by the processor 202. In an embodiment, the memory 204 may be configured to store biometric information of the user 114 in a secured storage. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may comprise suitable logic, circuitry, interfaces, and/or code that may be operable to receive input and provide an output to the user 114. The I/O device 206 may comprise various input and output devices that may be configured to communicate with the processor 202. The I/O device 206 may further include a biometric sensor to receive biometric information of the user 114. Examples of the input devices may include, but are not limited to, a touch screen, a camera, a biometric sensor, such as a fingerprint scanner, a retina scanner, a facial features detector, a keyboard, a mouse, a joystick, a microphone, a motion sensor, a light sensor, and/or a docking station. In accordance with an embodiment, the touch screen or the camera may be configured to receive the biometric information of the user 114. Examples of the output devices may include, but are not limited to, a display and/or a speaker.

The transceiver 208 may comprise suitable logic, circuitry, interfaces, and/or code that may be configured to communicate with one or more servers, such as the acquirer 104, via the communication network 112. The transceiver 208 may further be configured to communicate with the external apparatus, such as the EMV®-compliant POS terminal, via a short-range communication protocol, such as NFC. In accordance with an embodiment, the short-range communication between the electronic device 102 and the external apparatus may occur via a capacitive coupling through projected capacitive touch panels. The transceiver 208 may implement known technologies to support wired or wireless communication of the electronic device 102 with the communication network 112. The transceiver 208 may include, but is not limited to, an antenna, a radio frequency (RF) transceiver, one or more amplifiers, a tuner, one or more oscillators, a digital signal processor, a coder-decoder (CODEC) chipset, and/or a local buffer. The transceiver 208 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), time division multiple access (TDMA), the NFC, Bluetooth, Wireless Fidelity (Wi-Fi) (such as IEEE 802.11a, IEEE 802.11b, IEEE 802.11g and/or IEEE 802.11n), voice over Internet Protocol (VoIP), LTE, Wi-MAX, a protocol for email, instant messaging, MMS, and/or Short Message Service (SMS).

The payment application 210 may refer to a digital wallet and/or a token-based payment application. One or more virtual currency instruments may be configured and/or registered by use of the payment application 210. In accordance with an embodiment, the payment application 210 may be configured to communicate a token associated with a virtual currency instrument to the software module 212 of the electronic device 102. The payment application 210 may be configured to communicate a payment request with the token to an external apparatus, such as a POS terminal, via the transceiver 208. The payment request and token may be transmitted by use of one or more protocols, such as the NFC protocol. The payment application 210 may be configured to communicate an identifier of the payment application 210 to the merchant server 110, via the merchant website 218 or the merchant application 216.

The software module 212 may refer to a suitable logic, interface, and/or code that may be configured to read secure information through the payment application 210. The secure information may be stored in a secure storage of the memory 204 in an encrypted manner. The software module 212 may be a transaction-conducting service that may be compliant with the EMV® standard requirement. The software module 212 may be pre-installed at the electronic device 102. In an implementation, the software module 212 may be bundled with the merchant application 216. In another implementation, the software module 212 may be bundled with the payment application 210. In accordance with an embodiment, the software module 212, or a part of the software module 212, may be received from the merchant server 110 when a monetary transaction is initiated. For example, the software module 212, or a part of the software module 212, may be received as an applet from the merchant server 110, associated with the merchant website 218, for the monetary transaction. The software module 212 may be compliant with the EMV® standard requirement. The software module 212 may be different from the payment application 210.

The offline token module 214 may refer to another software module that may be configured to perform offline authentication of biometric information of the user 114. The biometric information of the user 114 may be compared with pre-stored biometric information of the user 114. The offline token module 214 may be pre-installed at the electronic device 102. The offline token module 214 may be configured to transmit an offline approval message to an external apparatus, such as the EMV®-complaint POS terminal. The offline message may signal to proceed as offline authorization of monetary transaction. The offline token module 214 may transmit the offline approval message based on the offline authentication. In accordance with an embodiment, the functionalities of the offline token module 214 may be integrated with the software module 212.

The merchant application 216 may refer to an e-commerce application that may provide an interface to enable selection of one or more products by the user 114. The merchant application 216 may be pre-installed at the electronic device 102. The merchant application 216 may communicate with the software module 212, the offline token module 214, and the payment application 210 at the electronic device 102. The merchant application 216 may communicate with one or more applications at the merchant server 110, via the communication network 112.

The merchant website 218 may refer to an e-commerce website that may provide a web-based interface to enable selection of one or more products by the user 114. The merchant website 218 may be accessed via the communication network 112. The merchant website 218 may be configured to receive the identifier of the payment application 210, via the communication network 112. The merchant website 218 may be further configured to communicate the software module 212, or a part of the software module 212, as an applet in association with the merchant server 110 to the electronic device 102 for a monetary transaction. The merchant website 218 may be configured to utilize the received identifier of the payment application 210 to communicate a push notification to the electronic device 102 for a payment request. Similarly, the received identifier may be utilized to establish remote communication with the payment application 210 from which a monetary transaction may be initiated.

In operation, a virtual currency instrument may be registered by use of the payment application 210 at the electronic device 102, by the user 114. The processor 202 may be configured to receive a token, via the transceiver 208, from the token server 106 at the time of registration of the virtual currency instrument. The processor 202 may be configured to receive input from the user 114. The user 114 input may be to launch the merchant application 216 at the electronic device 102 or access the merchant website 218, via the communication network 112. The processor 202 may be configured to receive input, via the I/O device 206, to select one or more products for a monetary transaction to conduct a purchase.

In instances when the merchant website 218 is used for the purchase, the processor 202 may be configured to communicate an identifier of the payment application 210, such as a mobile wallet, to the merchant server 110. The processor 202 may be configured to receive a payment request from the merchant server 110 in response to the communicated identifier.

In accordance with an embodiment, the processor 202 may be configured to receive input to select the virtual currency instrument by use of the payment application 210. The virtual currency instrument may be selected in response to receipt of the one or more payment options. The selection may indicate a confirmation by the user 114 for the monetary transaction for the purchase.

In accordance with an embodiment, the processor 202 may be configured to activate the software module 212 stored in the memory 204 of the electronic device 102. In instances when the merchant application 216 is used for the purchase, the activation of the software module 212 may be based on receipt of the token from the payment application 210. The receipt of the token may correspond to a confirmation of payment readiness by the user 114, who owns the token. In accordance with an embodiment, the software module 212 may be activated by the merchant application 216, associated with the merchant server 110. The activation may be in response to receipt of the token from the payment application 210. In instances when the merchant website 218 is used for the purchase, the activation of the software module 212 may be based on receipt of biometric information of the user 114 at the electronic device 102, via the I/O device 206. In such an instance, the biometric information provided by the user 114 indicates a confirmation for the monetary transaction.

In accordance with an embodiment, the processor 202 may be configured to generate a first request to receive user permission to access secure information stored at a secure storage of the memory 204. The secure information may correspond to a cryptogram, static authentication data, and/or dynamic authentication data. In accordance with an embodiment, the secure information may be the token that corresponds to the virtual currency instrument.

In accordance with an embodiment, the processor 202 may be configured to transmit a command from the software module 212 to the payment application 210 to request application cryptogram generation. The transmittal of the command may be an internal communication at the electronic device 102. The processor 202 may be configured to perform an offline authentication of the secure information read through the payment application 210 by the software module 212. In accordance with an embodiment, the authentication may be performed, based on biometric information of the user 114 who owns the token, a personal identification number (PIN) code known to the user 114, and/or information related to the user 114 stored on an external memory device to confirm the user 114 who owns the token. For instance, the information related to the user 114 may be a one-time password and/or a user identifier (ID) that may be stored in the external memory device. Such one-time password and/or the user ID of the user 114 may be transmitted, via a wireless communication, to the electronic device 102.

In accordance with an embodiment, the processor 202 may be configured to output an authentication result based on the authentication from the software module 212 for the monetary transaction. The authentication result may be transmitted to the merchant server 110 or an external apparatus for the monetary transaction. The transmission of the authentication result may be useful in the CNP scenario in online shopping. The authentication transmission may be used to validate that the user 114 and/or the actual virtual currency instrument holder (the cardholder) is indeed authorizing the monetary transaction for the purchase. The transmission of the authentication result may be further useful for an offline monetary transaction, where the external apparatus may be an EMV®-compliant POS terminal, described in detail in FIG. 4, FIG. 6A and FIG. 6B.

In accordance with an embodiment, the processor 202 may be configured to generate a second request to receive biometric information of the user 114, associated with the secure information. In accordance with an embodiment, the processor 202 may be configured to compare the received biometric information of the user 114 with the pre-stored biometric information of the user 114. The comparison may validate the user 114 and/or the electronic device 102 for the monetary transaction. The validation of the user 114 and/or the electronic device 102 may be an additional safety mechanism for the monetary transaction.

In accordance with an embodiment, the processor 202 may be configured to determine whether the monetary transaction is to be processed for offline approval or online approval. Such determination may be based on a monetary value associated with the monetary transaction and/or a state of connectivity with the token server 106.

In certain instances, the monetary value associated with the monetary transaction may be above a threshold value and/or the state of connectivity with the token server 106 may be established. In such instances, the processor 202 may be configured to communicate the token to the acquirer 104, via the transceiver 208, for an online approval of the monetary transaction. The processor 202 may be configured to generate a payment confirmation message based on the approval from the acquirer 104. The acquirer 104 may receive a confirmation of validation of the token from the token server 106 in association with the issuer 108 of the virtual currency instrument.

In certain instances, the monetary value associated with the monetary transaction may be below the threshold value and/or the state of connectivity with the token server 106 may not be established. In such instances, the processor 202 may be configured to perform a communication of a request by the software module 212 to the payment application 210 to proceed with offline approval of the token. The processor 202 may be configured to generate an offline approval message for the monetary transaction. The offline approval message may be generated by another software module, such as the offline token module 214, for offline authentication and/or approval of the monetary transaction. The offline approval may occur based on an offline validation of biometric information of the user 114 who owns the token or the PIN code associated with the user 114.

In accordance with an embodiment, the processor 202 may be configured to render on a display of the I/O device 206, a payment approval for the monetary transaction, based on the generation of the offline approval message. The payment approval may be rendered by the software module 212 at the electronic device 102.

In accordance with an exemplary aspect of the disclosure, when a state of connectivity with the token server 106 is not established, or Internet connectivity is not available for online approval of the monetary transaction, certain operations may be performed in the electronic device 102 (as described below). The processor 202 may be configured to receive an input, via the I/O device 206, to initiate the payment application 210 to render a monetary transaction. The processor 202 may be configured to communicate a payment request and the token associated with the virtual currency instrument, via the transceiver 208, to an external apparatus. The external apparatus may be the EMV®-compliant POS terminal. The payment request and the token may be communicated by the payment application 210 of the electronic device 102.

In accordance with an embodiment, the processor 202 may be configured to receive a request to proceed with an offline authentication of the monetary transaction, via the payment application 210 of the electronic device 102. The request may be received from the external apparatus when a state of connectivity between the external apparatus and the token server 106 and/or issuer 108 is not established. The request may be further received when a monetary value associated with the monetary transaction is below the threshold value.

In accordance with an embodiment, the processor 202 may be configured to activate a software module, such as the offline token module 214. The offline token module 214 may be different from payment application 210 at the electronic device 102. The activation of the offline token module 214 may occur to process an offline authentication of the monetary transaction. The processor 202 may be configured to generate a request at the electronic device 102 to receive information of the user 114 who owns the token. The information of the user 114 may correspond to biometric information or a PIN code associated with the virtual currency instrument or the token.

In accordance with an embodiment, the processor 202 may be configured to perform an offline authentication of the received biometric information or PIN code. The offline authentication may be based on a comparison of the received biometric information or PIN code with pre-stored biometric information of the user 114 or PIN code used at the registration time of the virtual currency instrument.

In accordance with an embodiment, the processor 202 may be configured to generate and/or output an authentication result for the monetary transaction at the electronic device 102. The authentication result generation may be based on the offline authentication from the offline token module 214 for the monetary transaction. In instances when the authentication result indicates a successful authentication, the processor 202 may be configured to transmit an offline approval message to the external apparatus for the monetary transaction. The offline approval message may be transmitted by the offline token module 214 to instruct the external apparatus to proceed as offline authorization of the monetary transaction. The processor 202 may be configured to receive an authorization message for the monetary transaction from the external apparatus. The authorization message may be received via the payment application 210. The authorization message may correspond to final approval of the monetary transaction in an offline shopping scenario.

In accordance with an embodiment, in instances when the authentication result indicates an unsuccessful authentication, the processor 202 may be configured to transmit an offline denial message for the monetary transaction to the external apparatus. The offline denial message may be transmitted by the software module 212, via the transceiver 208. The processor 202 may be configured to receive an authorization denial message for the monetary transaction from the external apparatus, via the transceiver 210. The authorization denial message may correspond to final denial of the monetary transaction. The authorization denial message may be received by the payment application 210, via the transceiver 208.

Figure 3A:
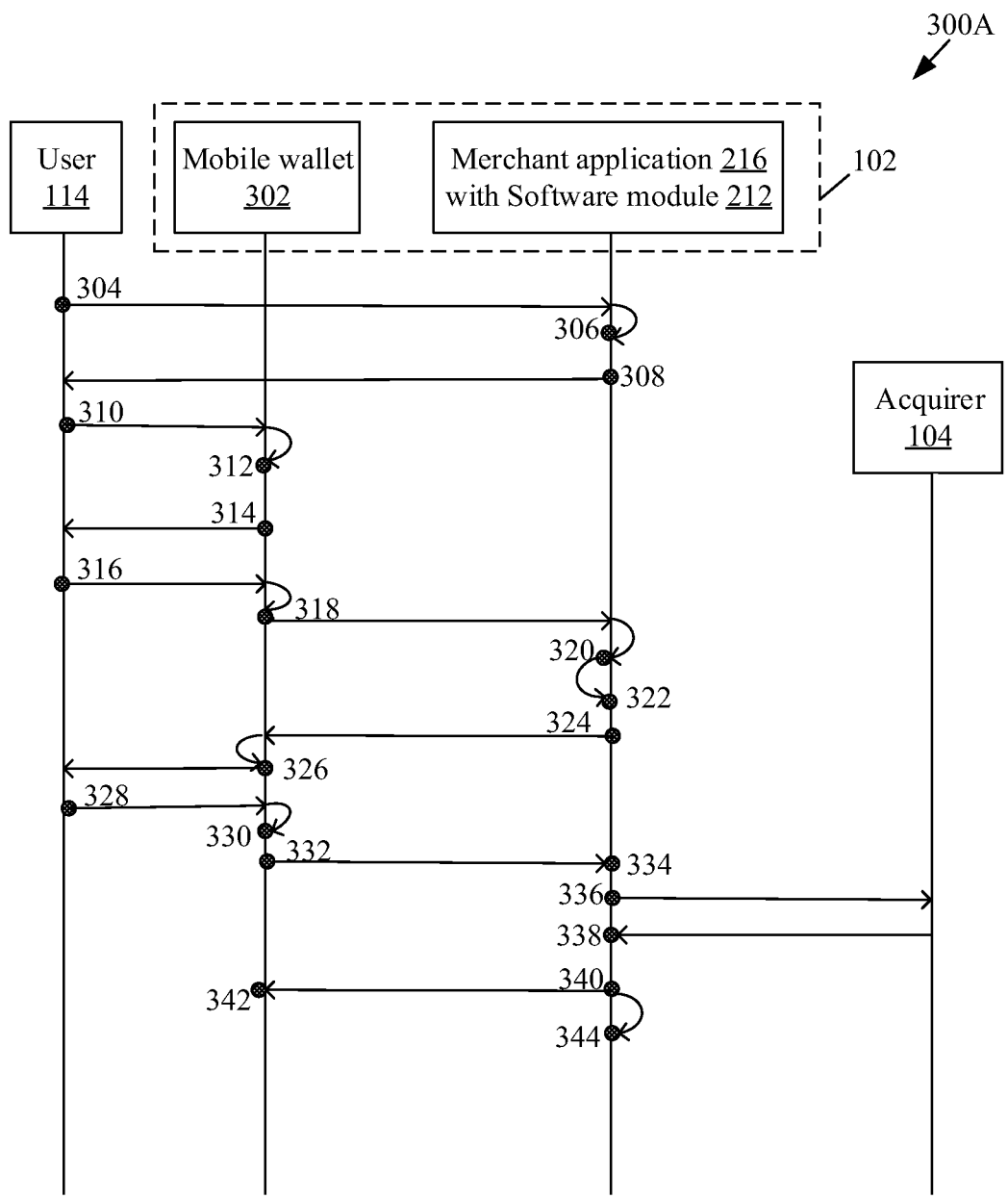
FIGS. 3A and 3B illustrate various exemplary sequence diagrams in a first exemplary scenario for implementation of the disclosed system and method for authentication of a virtual currency instrument for a monetary transaction, in accordance with an embodiment of the disclosure.
Figure 3B:
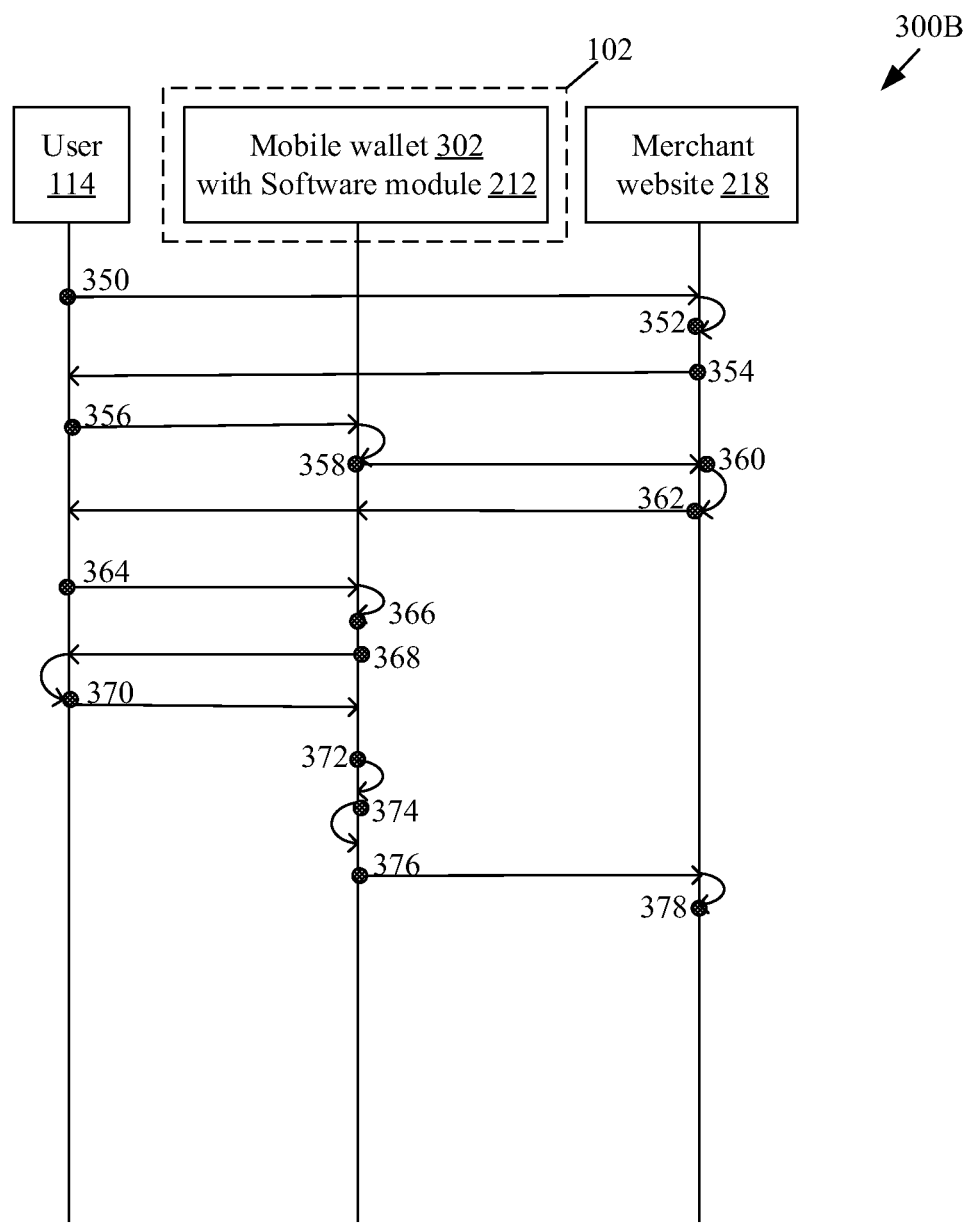

FIGS. 3A and 3B illustrate exemplary sequence diagrams in a first exemplary scenario for implementation of the disclosed system and method for authentication of a virtual currency instrument for a monetary transaction, in accordance with an embodiment of the disclosure. The first exemplary scenario corresponds to a system environment where the Internet connectivity is available for the monetary transaction. FIGS. 3A and 3B are explained in conjunction with elements from FIG. 1 and FIG. 2. FIG. 3A depicts an exemplary sequence diagram 300A that illustrates authentication of a virtual currency instrument to process a monetary transaction in an online shopping environment, as a card-present transaction. With reference to FIG. 3A, there is shown the user 114, the electronic device 102 and the acquirer 104. The electronic device 102 may include a mobile wallet 302, the software module 212, and the merchant application 216. The software module 212 may be bundled with the merchant application 216. In accordance with the first exemplary scenario, the mobile wallet 302 may correspond to the payment application 210.

At time point 304, the user 114 may provide input, by use of the I/O device 206, which corresponds to completion of selection of one or more products in a shopping cart of the merchant application 216. At time point 306, in response to the completion of the selection, the merchant application 216 may be configured to capture data associated with the shopping cart, and may proceed to payment. At time point 308, the merchant application 216 may be configured to display a list of payment options at the electronic device 102 for the user 114.

At time point 310, the user 114 may provide input to select the mobile wallet 302. At time point 312, the mobile wallet 302 may be launched. At time point 314, the mobile wallet 302 may generate a request for the user 114 to select a virtual currency instrument, via the mobile wallet 302.

At time point 316, the user 114 may provide an input to select the virtual currency instrument by use of the mobile wallet 302. At time point 318, the mobile wallet 302 may be configured to communicate a token to the merchant application 216. The token may be communicated upon receipt of the input that corresponds to the selection of the virtual currency instrument. The token corresponds to a confirmation of payment readiness for a monetary transaction by the user 114 who owns the token. The token may be previously received from the token server 106 at registration time of the virtual currency instrument (prior to the time point 304, not shown). At time point 320, the merchant application 216 may be configured to activate the software module 212 at the electronic device 102 based on the receipt of the confirmation, such as the token.

At time point 322, the software module 212 may read the token at the electronic device 102 to perform an offline authentication of the token. At time point 324, the software module 212 may be configured to communicate a request to the mobile wallet 302 to receive biometric information, such as a finger scan, of the user 114. The request for biometric information may act as an additional confirmation from the user 114 for the monetary transaction. At time point 326, the mobile wallet 302 may be configured to generate a request for the user 114 to provide biometric information.

At time point 328, the user 114 may provide biometric information, such as fingerprint data, in response to the generated request. At time point 330, the mobile wallet 302 may be configured to validate the received fingerprint data of the user 114. The validation may be based on a comparison of the received fingerprint data with pre-stored fingerprint data of the user 114. In accordance with an embodiment, an identifier of the electronic device 102 may be checked to ascertain whether the fingerprint data is received from a pre-defined trusted device. At time point 332, the mobile wallet 302 may be configured to communicate the validation of confirmation to the software module 212.

At time point 334, the software module 212 may receive the validation of confirmation to process the monetary transaction as card-present transaction. The validation of confirmation may be an additional authentication. At time point 336, the software module 212 may communicate the token to the acquirer 104 for an online approval of the monetary transaction. At time point 338, the software module 212 may process the monetary transaction as card-present transaction, and communicate an approval message for the monetary transaction to the mobile wallet 302.

At time point 340, the mobile wallet 302 may receive the approval message that indicates a confirmation of approval of the monetary transaction, and may indicate completion of the monetary transaction. At time point 342, the merchant application 216 may display a payment confirmation message for the monetary transaction. Thus, the reading of the token by the software module 212 at the electronic device 102 to perform an offline authentication, and further the validation of the received fingerprint data of the user 114 may enhance overall security of the monetary transaction in the online shopping scenario. Further, the merchant associated with the merchant server 110 may accept the virtual currency instrument, such as a credit card, over the internet without CNP fees as the monetary transaction is processed as the card-present transaction.

FIG. 3B is another exemplary sequence diagram 300B that illustrates authentication of a virtual currency instrument to process a monetary transaction in an online shopping environment, as card-present transaction. With reference to FIG. 3B, there is shown the user 114, the electronic device 102, and the merchant website 218. The electronic device 102 may include the mobile wallet 302 that may be bundled with the software module 212. The merchant website 218 may be accessed over the Internet at the electronic device 102. The merchant website 218 may be associated with the merchant server 110.

In operation, at time point 350, the user 114 may provide input, by use of the I/O device 206, which corresponds to completion of selection of one or more products in a shopping cart of the merchant website 218. At time point 352, in response to the completion of the selection, the merchant website 218 may be configured to capture, data associated with the shopping cart, and may proceed to payment. At time point 354, the merchant website 218 may be configured to display a list of payment options at the electronic device 102 for the user 114.

At time point 356, the user 114 may provide input to select the mobile wallet 302. At time point 358, the mobile wallet 302 may be launched, and an identifier of the mobile wallet 302 may be communicated to the merchant website 218. At time point 360, the merchant website 218 may receive the communicated identifier of the mobile wallet 302.

At time point 362, the merchant website 218 may be configured to communicate a payment request as a push notification to the electronic device 102. At time point 364, the user 114 may provide an input that corresponds to a retina scan (biometric information), by use of the I/O device 206. At time point 366, the software module 212 may be activated in response to receipt of the retina scan of the user 114. The software module 212 may unpack the payment request for a monetary transaction. The retina scan provided by the user 114 may indicate a confirmation for the monetary transaction.

At time point 368, the mobile wallet 302 may be initiated to generate a request for the user 114 to select a virtual currency instrument, such as a credit card, via the mobile wallet 302. At time point 370, the user 114 may provide an input to select the virtual currency instrument by use of the mobile wallet 302. At time point 372, the software module 212 may transmit a command to the mobile wallet 302 to request application cryptogram generation.

At time point 374, the software module 212 may perform offline authentication based on reading of cryptogram, by the software module 212, from a secure storage of the mobile wallet 302. At time point 376, the software module 212 may process the monetary transaction as card-present transaction, and communicate an approval message for the monetary transaction to the merchant website 218. At time point 378, the merchant website 218 may receive a payment completion message for the monetary transaction. The payment completion message may be displayed at the electronic device 102 for the user 114. Thus, the reading of the cryptogram by the software module 212 from a secure storage of the mobile wallet 302, and other above mentioned operations enhances the overall security of the monetary transaction in the online shopping scenario. Further, the merchant associated with the merchant server 110 may accept the virtual currency instrument, such as an EMV®-based digital card, over the internet without CNP fees as the monetary transaction is processed as the card-present transaction. In other words, the software module 212 provides a secured mechanism to conduct the monetary transaction useful in the online shopping environment, similar to that of an EMV® reader to accept and validate payments in a brick-and-mortar shop as card-present transaction.

Figure 4:
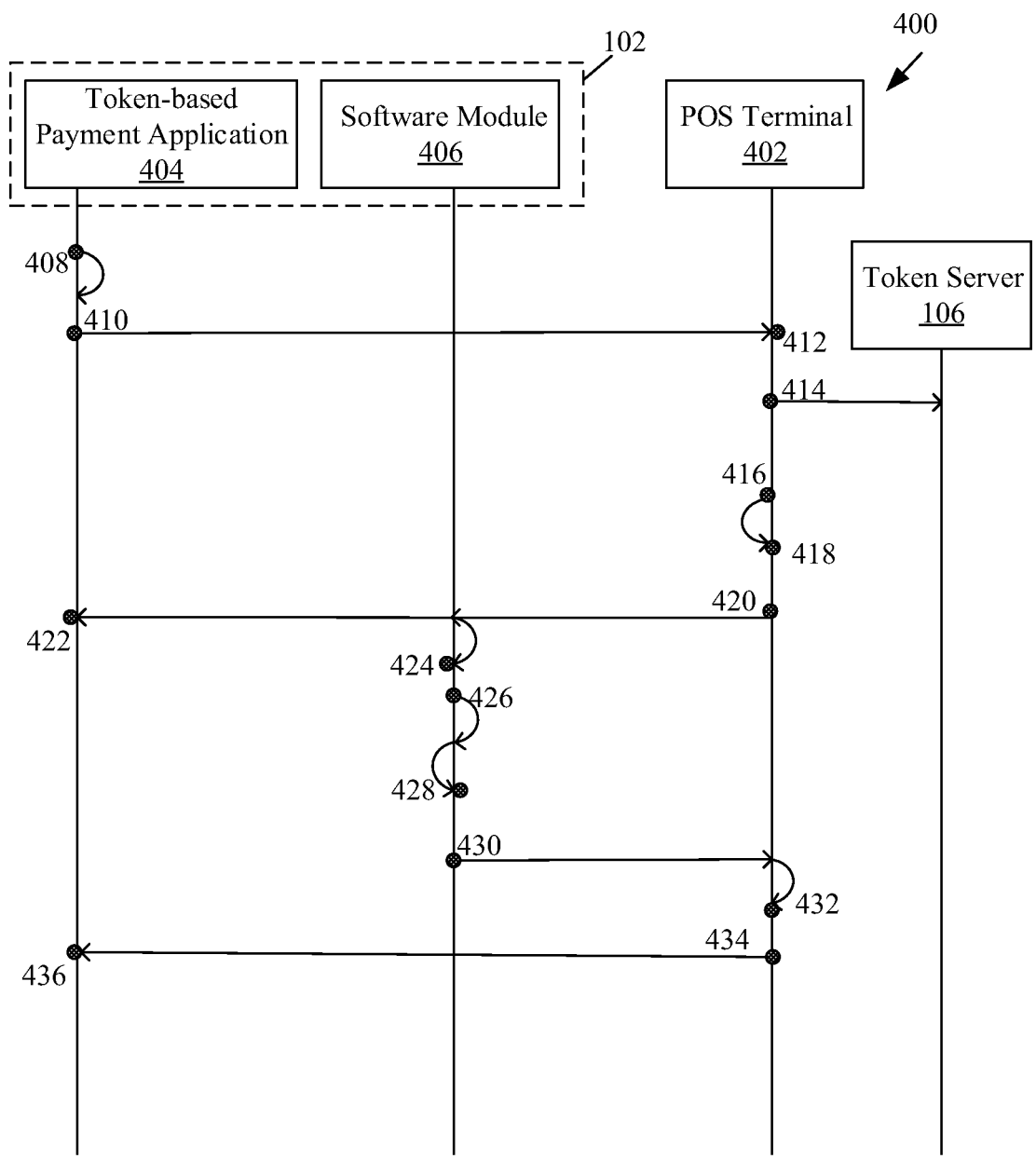
FIG. 4 illustrates an exemplary sequence diagram in a second exemplary scenario for implementation of the disclosed system and method for authentication of a virtual currency instrument for a monetary transaction, in accordance with an embodiment of the disclosure.

FIG. 4 illustrates an exemplary sequence diagram in a second exemplary scenario for implementation of the disclosed system and method for authentication of a virtual currency instrument for a monetary transaction, in accordance with an embodiment of the disclosure. The second exemplary scenario corresponds to a system environment where the Internet connectivity is not available for the monetary transaction. FIG. 4 is explained in conjunction with elements from FIG. 1 and FIG. 2. FIG. 4 is an exemplary sequence diagram 400 that illustrates authentication of a virtual currency instrument to process a monetary transaction in an offline shopping environment. With reference to FIG. 4, there is shown the electronic device 102, the token server 106, and a POS terminal 402. The electronic device 102 may include a token-based payment application 404 and a software module 406. In accordance with the second exemplary scenario, the POS terminal 402 may correspond to the external apparatus. The token-based payment application 404 may correspond to the payment application 210. The software module 406 may correspond to the offline token module 214.

In operation, at time point 408, an input may be received at the electronic device 102 to invoke the token-based payment application 404 for a monetary transaction. The token-based payment application 404 may be initiated by the user 114 via a finger scan. In an instance, token-based payment application 404 may be invoked by the user 114 by providing an input of a PIN code. At time point 410, the token-based payment application 404 may be configured to communicate a payment request and a token associated with a virtual currency instrument to the POS terminal 402. At time point 412, the POS terminal 402 may be configured to receive the payment request and the token from the token-based payment application 404 of the electronic device 102.

At time point 414, the POS terminal 402 may be configured to check a state of connectivity with the token server 106 to send the received token and payment information to the token server 106. At time point 416, the POS terminal 402 may receive a message of unavailability of the token server 106. At time point 418, the POS terminal 402 may determine whether the monetary transaction may be processed for offline approval. The determination for the offline approval may be based on a comparison of a monetary value of the monetary transaction with a monetary threshold value.

At time point 420, the POS terminal 402 may communicate request to proceed with offline authentication of the monetary transaction to the token-based payment application 404 of the electronic device 102. The POS terminal 402 may proceed with the offline approval when the monetary value associated with the monetary transaction is below a threshold value, such as "USD 50". At time point 422, the token-based payment application 404 of the electronic device 102 may receive the request to proceed with the offline authentication from the POS terminal 402. At time point 424, the software module 406 may be activated at the electronic device 102 for the offline authentication.

At time point 426, the software module 406 may generate a request to receive the PIN code from the user 114. In instances when the token-based payment application 404 is invoked by the user 114 by providing the input of the PIN code, the software module 406 may generate a request to receive a fingerprint scan from the user 114 instead of the PIN code. At time point 428, the software module 406 may perform offline authentication of received PIN code with a pre-stored PIN code of the user 114. The pre-stored PIN code may correspond to the PIN code that may be used at the time of registration of the virtual currency instrument. In instances when fingerprint scan is received from the user 114, the software module 406 may perform offline authentication based on validation of the fingerprint scan similar to that of the PIN code. At time point 430, the software module 406 may transmit, from the electronic device 102, an offline approval message to the POS terminal 402.

At time point 432, the POS terminal 402 may proceed with offline authorization of the monetary transaction in response to receipt of the offline approval message for the monetary transaction. At time point 434, the POS terminal 402 may communicate a final approval message to the token-based payment application 404 for the monetary transaction for the user 114. At time point 436, the token-based payment application 404 may receive the final approval message for the monetary transaction. Thus, the user 114 may make an offline purchase in a secured manner in the offline situation, such as in an airplane or a subway, where Internet connectivity may not be available by use of the token-based payment application 404. In such a scenario, a token-based mobile payment solution continues to enable a payment without direct connectivity to the token server 106, as described above.

Figure 5A:
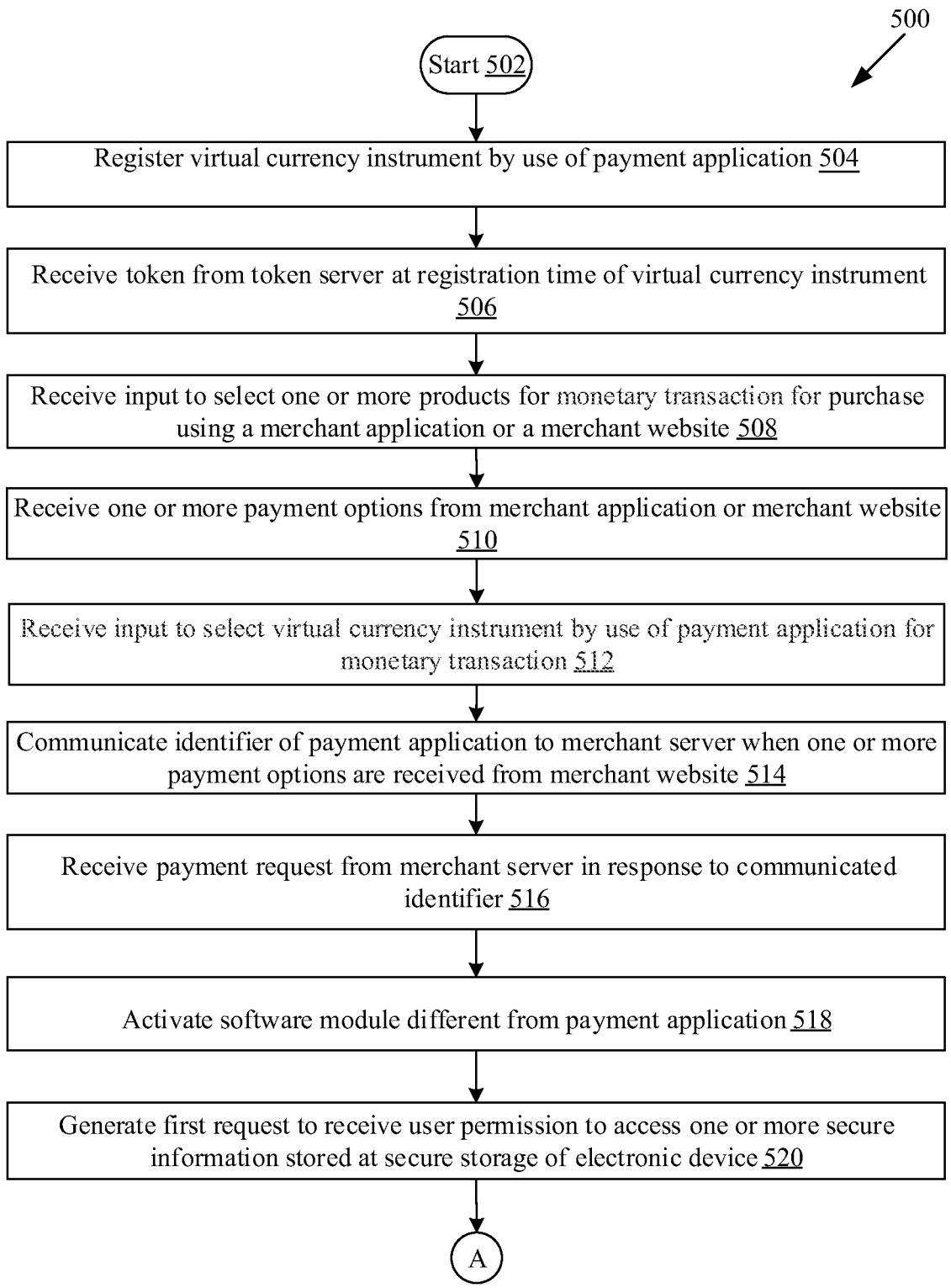
FIGS. 5A, 5B, and 5C collectively depict a flow chart that illustrates an exemplary method for authentication of a virtual currency instrument for a monetary transaction, in accordance with an embodiment of the disclosure.
Figure 5B:
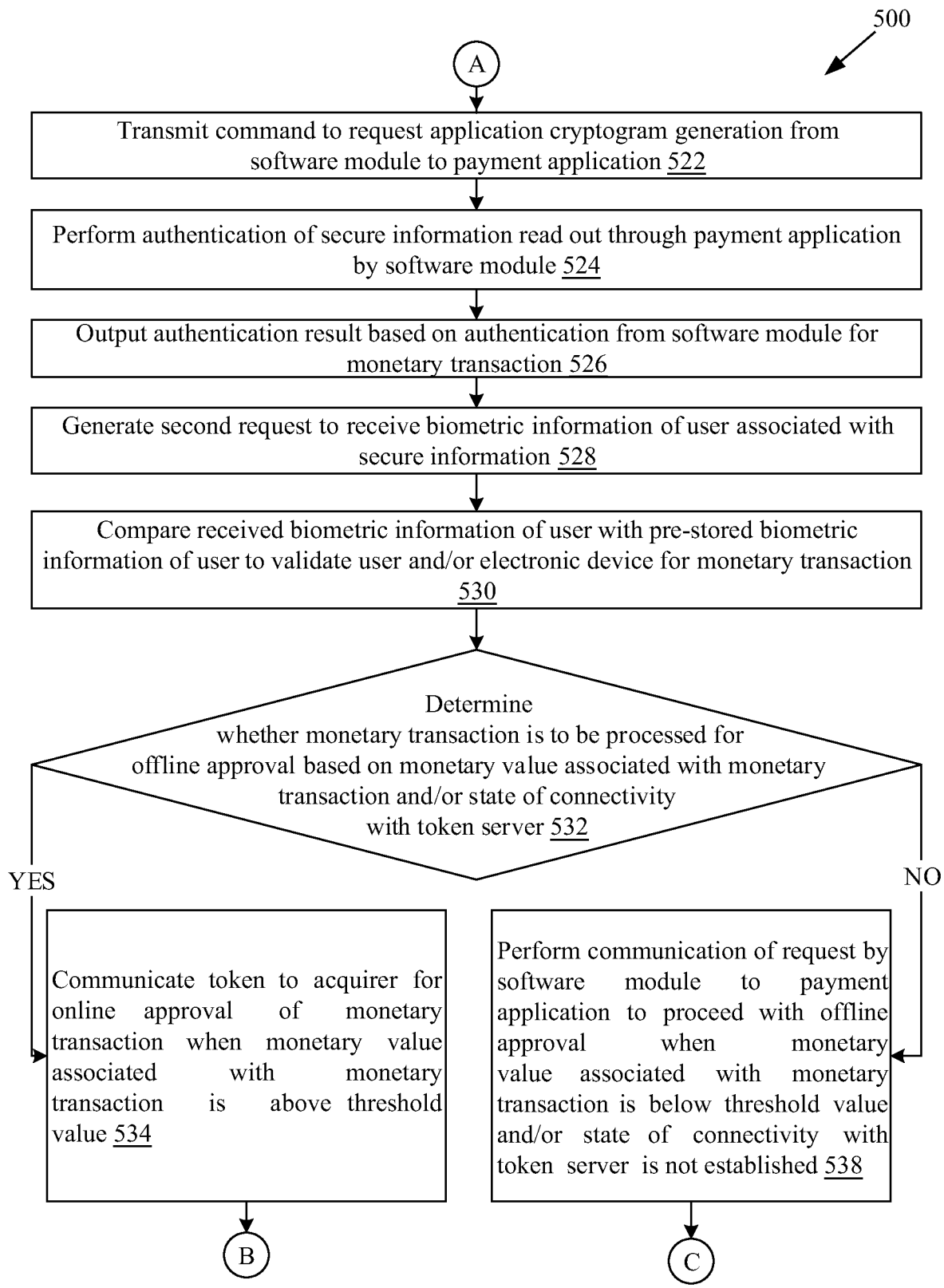
Figure 5C:
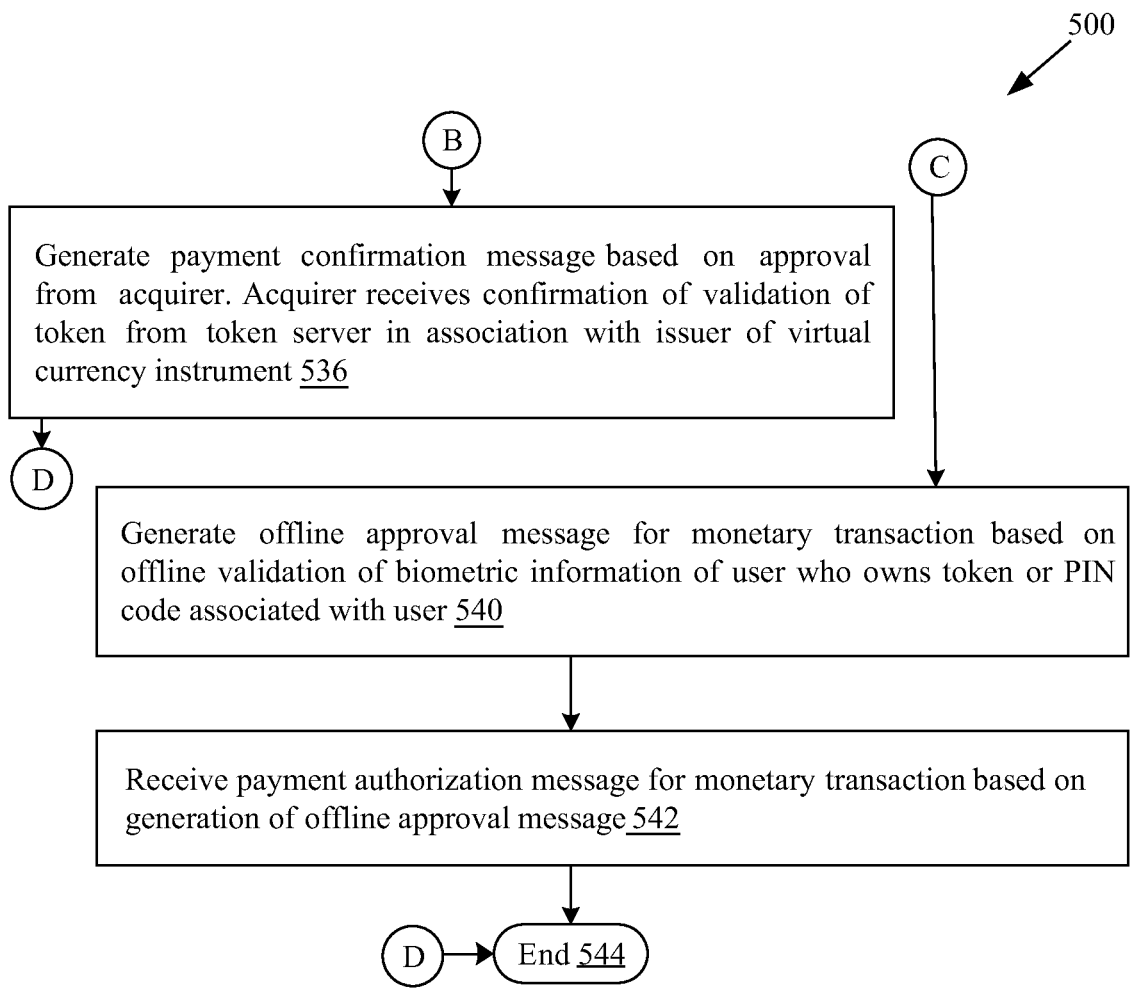

FIGS. 5A, 5B, and 5C collectively depict a flow chart that illustrates an exemplary method for authentication of a virtual currency instrument for a monetary transaction, in accordance with an embodiment of the disclosure. With reference to FIGS. 5A, 5B, and 5C, there is shown a flow chart 500. The flowchart 500 illustrates a method implemented at the electronic device 102 for authentication of the virtual currency instrument for the monetary transaction. The flow chart 500 is described in conjunction with FIGS. 1, 2, 3A and 3B. The method starts at step 502 and proceeds to step 504.

At step 504, a virtual currency instrument may be registered by use of a payment application 210. At step 506, a token may be received from the token server 106 at the time of registration of the virtual currency instrument. At step 508, an input may be received to select one or more products for a monetary transaction to conduct a purchase. The one or more products may be selected for the monetary transaction by use of the merchant application 216 or the merchant website 218.

At step 510, one or more payment options may be received from the merchant application 216 or the merchant website 218. At step 512, an input may be received to select the virtual currency instrument by use of the payment application 210. The selection may indicate a confirmation by the user 114 for the monetary transaction for the purchase. In instances when the merchant website 218 is used for the purchase, the control passes to step 514. In instances when the merchant application 216 is used for the purchase, the control may pass directly to step 518.

At step 514, an identifier of the payment application 210 may be communicated from the electronic device 102 to the merchant server 110. The identifier may be communicated when the one or more payment options are received. At step 516, a payment request may be received from the merchant server 110 in response to the communicated identifier.

At step 518, the software module 212 may be activated. The software module 212 may be different from the payment application 210. In instances when the merchant application 216 is used for the purchase, the activation of the software module 212 may be based on receipt of the token from the payment application 210. In instances when the merchant website 218 is used for the purchase, the activation of the software module 212 may be based on receipt of biometric information of the user 114. In such an instance, the biometric information provided by the user 114 indicates a confirmation by the user 114 for the monetary transaction.

At step 520, a first request may be generated to receive user permission to access secure information stored at a secure storage of the electronic device 102. The secure information may correspond to a cryptogram, static authentication data, and/or dynamic authentication data. In accordance with an embodiment, the secure information may be the token associated with the virtual currency instrument. At step 522, a command may be transmitted from the software module 212 to the payment application 210, to request application cryptogram generation.

At step 524, an authentication of the secure information may be performed. The secure information may be read through the payment application 210 by the software module 212. The authentication may be performed offline. The authentication may be the SDA or DDA defined in the EMV® standard for chip payments. At step 526, an authentication result may be outputted based on the authentication from the software module 212 for the monetary transaction. The authentication result may be transmitted to the merchant server 110 or the external apparatus for the monetary transaction.

At step 528, a second request to receive biometric information of the user 114 associated with the secure information, may be generated. At step 530, the received biometric information of the user 114 may be compared with pre-stored biometric information of the user 114. The comparison may validate the user 114 and/or the electronic device 102 for the monetary transaction. At step 532, whether the monetary transaction is to be processed for offline approval or online approval, may be determined. The determination may be based on a monetary value associated with the monetary transaction and/or a state of connectivity with the token server 106. In instances when the monetary value associated with the monetary transaction is above a threshold value and/or a state of connectivity with the token server 106 is established, the control may pass to step 534. In instances when the monetary value associated with the monetary transaction is below a threshold value and/or a state of connectivity with the token server 106 is not established, the control may pass to step 538.

At step 534, the token may be communicated from the electronic device 102 to acquirer 104 for online approval of monetary transaction. The token may be communicated for online approval when monetary value associated with monetary transaction is above threshold value. At step 536, a payment confirmation message may be generated based on the approval from the acquirer 104. The acquirer 104 may receive a confirmation of validation of the token from the token server 106 in association with the issuer 108 of the virtual currency instrument. The control passes to end step 544.

At step 538, a communication of a request by the software module 212 to the payment application 210 to proceed with offline approval, may be performed. At step 540, an offline approval message may be generated for the monetary transaction. The offline approval message may be generated by the software module 212 or another software module, such as an offline token module 214 for offline authentication and/or approval of the monetary transaction.

At step 542, an authorization message for the monetary transaction may be received by the payment application 210 of the electronic device 102 based on the generation of the offline approval message. The authorization message that corresponds to final payment approval may be rendered. The control passes to end step 544.

Figure 6A:
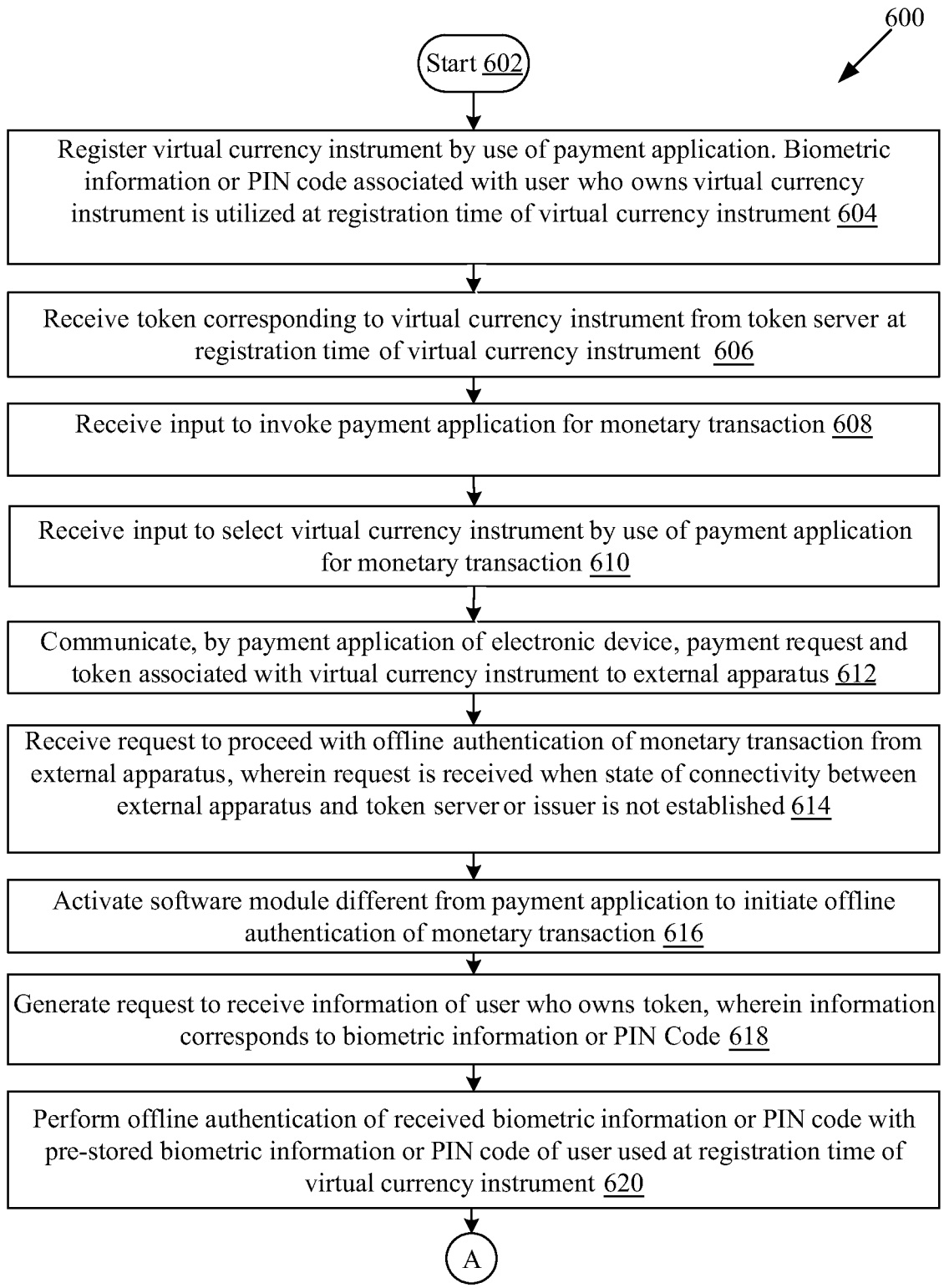
FIGS. 6A and 6B collectively depict another flow chart that illustrates another exemplary method for authentication of a virtual currency instrument for a monetary transaction, in accordance with an embodiment of the disclosure.
Figure 6B:
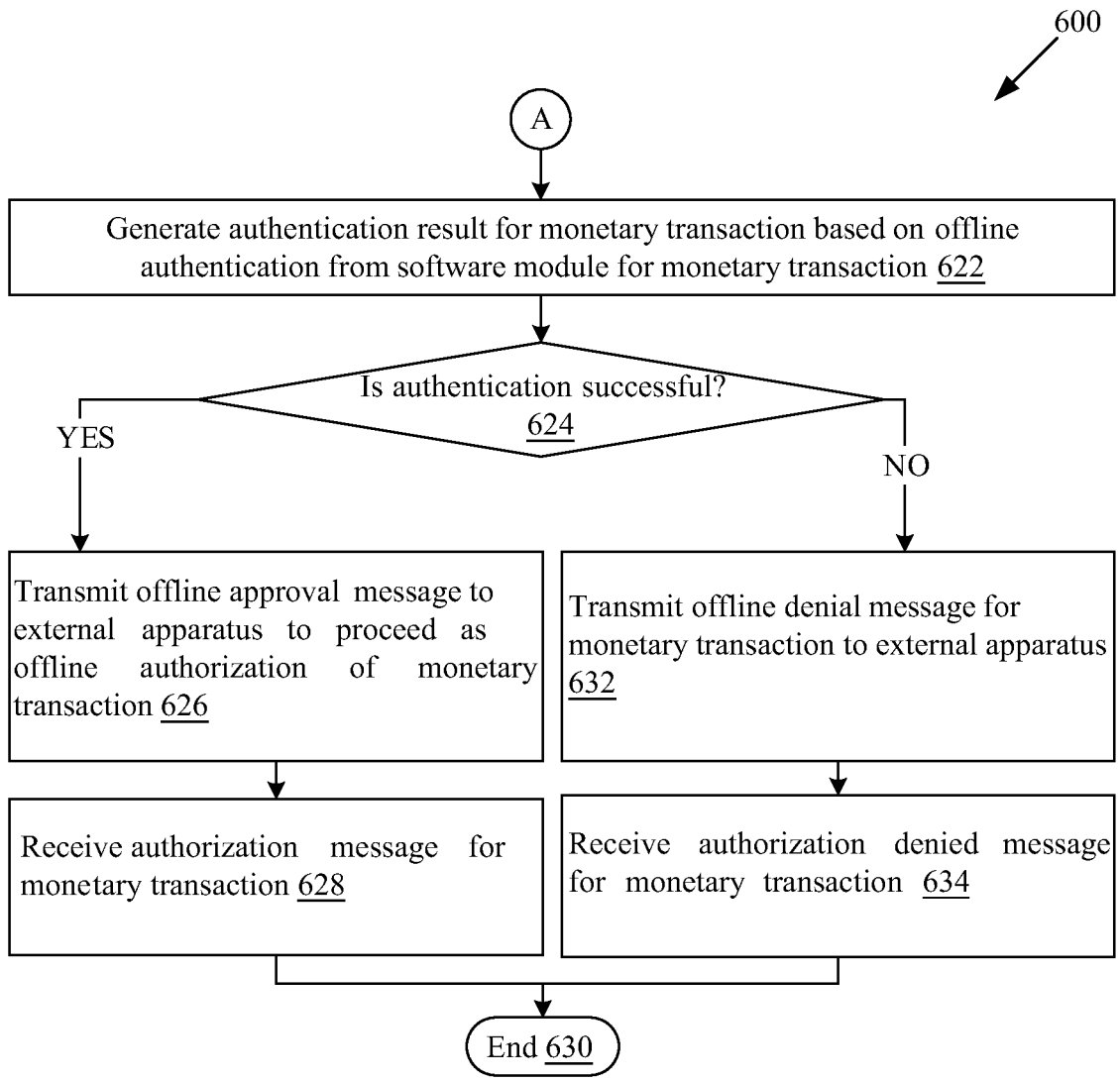

FIGS. 6A and 6B collectively depict is flow chart that illustrates another exemplary method for authentication of a virtual currency instrument for a monetary transaction, in accordance with an embodiment of the disclosure. With reference to FIGS. 6A and 6B, there is shown a flow chart 600. The flowchart 600 illustrates the other method implemented at the electronic device 102 for an authentication of the virtual currency instrument for the monetary transaction. The flow chart 600 is described in conjunction with FIGS. 1, 2, and 4. The method starts at step 602 and proceeds to step 604.

At step 604, a virtual currency instrument may be registered by use of payment application 210. Biometric information or a PIN code associated with a user, such as the user 114, who owns the virtual currency instrument may be utilized at registration time of the virtual currency instrument. At step 606, a token that corresponds to the virtual currency instrument may be received. The token may be received from the token server 106 at the registration time of the virtual currency instrument.

At step 608, an input to invoke the payment application 210 for a monetary transaction may be received. At step 610, an input to select the virtual currency instrument by use of the payment application 210 for the monetary transaction may be received.

At step 612, a payment request and the token associated with the virtual currency instrument may be communicated to an external apparatus, such as the EMV®-compliant POS terminal. The payment request and the token may be communicated by the payment application 210 of the electronic device 102.

At step 614, a request to proceed with an offline authentication of the monetary transaction may be received by the payment application 210 of the electronic device 102. The request may be received from the external apparatus when a state of connectivity between the external apparatus and the token server 106 and/or issuer 108 is not established. The request may further be received when a monetary value associated with the monetary transaction is below a threshold value. At step 616, a software module, such as the offline token module 214, different from payment application 210 may be activated to process an offline authentication of the monetary transaction.

At step 618, a request to receive information of the user 114 who owns the token may be generated. The information of the user 114 may correspond to biometric information or PIN Code associated with the virtual currency instrument or the token. At step 620, an offline authentication of the received biometric information or PIN code may be performed. The offline authentication may be based on a comparison with pre-stored biometric information of the user 114 or PIN code used at the registration time of the virtual currency instrument.

At step 622, an authentication result for the monetary transaction may be generated. The authentication result generation may be based on the offline authentication from the software module for the monetary transaction. At step 624, it may be determined whether the authentication is successful. In instances when the authentication result indicates a successful authentication, the control passes to step 626. In instances when the authentication result indicates an unsuccessful authentication, the control passes to step 632.

At step 626, an offline approval message for the monetary transaction may be transmitted by the software module 212 of the electronic device 102 to the external apparatus to proceed as offline authorization of the monetary transaction. At step 628, an authorization message for the monetary transaction may be received by the payment application 210 from the external apparatus. The control passes to end step 630.

At step 632, an offline denial message for the monetary transaction may be transmitted by the software module of the electronic device 102 to the external apparatus. At step 634, an authorization denial message for the monetary transaction may be received by the payment application 210 from the external apparatus. The authorization denial message may correspond to final denial of the monetary transaction. The control passes to end step 630.

In accordance with an embodiment of the disclosure, a system for authenticating a virtual currency instrument by use of a payment application for a monetary transaction is disclosed. The electronic device 102 may comprise one or more circuits and/or processors (hereinafter referred to as the processor 202 (as shown in FIG. 2)). The processor 202 may be configured to activate the software module 212 different from the payment application 210 at the electronic device 102 (as shown in FIG. 1). The processor 202 may be configured to perform, at the electronic device 102, an authentication of secure information read through the payment application 210 by the software module. The processor 202 may be configured to output, at the electronic device 102, an authentication result based on the authentication from the software module for the monetary transaction.

Various embodiments of the disclosure may provide a non-transitory computer readable medium and/or storage medium, and/or a non-transitory machine readable medium and/or storage medium having stored thereon, a set of computer-executable instructions for causing a machine and/or a computer to authenticate a virtual currency instrument for a monetary transaction. The set of computer-executable instructions in an electronic device, such as the electronic device 102, may cause the machine and/or computer to perform the steps that comprise activation of the software module different from the payment application 210 at the electronic device 102. An authentication of secure information read through the payment application 210 by the software module, may be performed at the electronic device 102. An authentication result may be outputted at the electronic device 102 based on the authentication from the software module for the monetary transaction.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions. It may be understood that depending on the embodiment, some of the steps described above can be eliminated, while other additional steps can be added, and the sequence of steps can be changed.

The present disclosure may also be embedded in a computer program product, which comprises all the features enabling the implementation of the methods described herein, and which when loaded in a computer system is able to carry out these methods. Computer program, in the present context, means any expression, in any language, code or notation, of a set of instructions intended to cause a system having an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method, comprising:
   in an electronic device comprising circuitry and a memory that stores a payment application, a software module, secure information in an encrypted manner, and first biometric information associated with a user:
   receiving, by said circuitry, a user input for selection of a monetary transaction via a merchant server;

generating, by said circuitry, a first request to receive a user permission to access said secure information stored in said memory of said electronic device;

transmitting, by said circuitry, a command to generate a cryptogram corresponding to a token associated with said user by said software module to said payment application;

authenticating, by said circuitry, said secure information read through said payment application, wherein said secure information corresponds to said generated cryptogram;

generating, by said circuitry, a second request to receive second biometric information of said user associated with said token based on said authentication;

comparing, by said circuitry, said first biometric information with said second biometric information; and validating, by said circuitry, said electronic device for said monetary transaction based on said comparison of said first biometric information with said second biometric information;

determining, by said circuitry, one of an online authentication of said monetary transaction or an offline authentication of said monetary transaction, based on said authentication of said secure information and at least one of:
said validation of said electronic device, or
a comparison of a monetary value associated with said monetary transaction and a threshold value;

generating, by said circuitry, an offline approval message for said monetary transaction in a case said monetary value associated with said monetary transaction is below said threshold value; and outputting, by said circuitry, a payment approval on a display device based on said generation of said offline approval message for said monetary transaction.

2. The method according to claim 1, further comprising authenticating said secure information based on at least one of a Static Data Authentication or a Dynamic Data Authentication for chip payments.

3. The method according to claim 1, wherein said secure information corresponds to at least one of said cryptogram, static authentication data, or dynamic authentication data.

4. The method according to claim 3, further comprising authenticating said secure information based on at least one of:
said first biometric information of said user,
a Personal identification Number (PIN) code, or
specific information stored on an external memory device to confirm said user.

5. The method according to claim 1, wherein said method further comprises receiving a part of said software module as an applet from said merchant server associated with a merchant website for said monetary transaction.

6. The method according to claim 5, further comprising receiving said applet via at least one of a Multimedia Messaging Service (MMS), an email, or link information for download.

7. The method according to claim 1, further comprising activating, by said circuitry, said software module based on receipt of said token from said payment application.

8. The method according to claim 1, further comprising:
communicating, by said circuitry, an identifier of said payment application to said merchant server; and
receiving, by said circuitry, a payment request from said merchant server based on said communicated identifier.

9. The method according to claim 1, further comprising authenticating, by said circuitry, said secure information offline.

10. The method according to claim 1, wherein
said authentication of said secure information further comprises verifying, by said circuitry, header information of said token, and
said method further comprises receiving, by said circuitry, said token from a token server at a registration time of a virtual currency instrument at said electronic device.

11. The method according to claim 10, further comprising:
determining said monetary value is above said threshold value; and
communicating, by said circuitry, said token to an acquiring circuitry for an online approval based on said determination that said monetary value is above said threshold value.

12. The method according to claim 11, further comprising:
receiving, by said circuitry, said online approval from said acquiring circuitry; and
generating, by said circuitry, a confirmation message based on said reception of said online approval from said acquiring circuitry.

13. The method according to claim 1, further comprising rendering, at said electronic device by said software module, a payment completion message of said monetary transaction based on said generation of said offline approval message.

14. A system, comprising:
an electronic device comprising:
a memory configured to store a payment application, a software module, secure information in an encrypted manner, and first biometric information associated with a user;
a display device; and
circuitry that:
receives a user input for selection of a monetary transaction via a merchant server;
generates a first request to receive a user permission to access said secure information stored in said memory of said electronic device;
transmits a command to generate a cryptogram corresponding to a token associated with said user by said software module to said payment application;
authenticates said secure information read through said payment application, wherein said secure information corresponds to said generated cryptogram;
generates a second request to receive second biometric information of said user associated with said token based on said authentication;
compares said first biometric information with said second biometric information;
validates said electronic device for said monetary transaction based on said comparison of said first biometric information with said second biometric information;
determines one of an online authentication of said monetary transaction or an offline authentication of said monetary transaction, based on said authentication of said secure information and at least one of:
said validation of said electronic device, or
a comparison of a monetary value associated with said monetary transaction and a threshold value;

generates an offline approval message for said monetary transaction in a case said monetary value associated with said monetary transaction is below said threshold value; and outputs a payment approval on said display device based on said generation of said offline approval message for said monetary transaction.

15. The system according to claim 14, wherein said circuitry further authenticates said secure information based on at least one of a Static Data Authentication or a Dynamic Data Authentication for chip payments.

16. The system according to claim 14, wherein said secure information is at least one of said cryptogram, static authentication data, or dynamic authentication data.

* * * * *